(12) United States Patent
Munger et al.

(10) Patent No.: US 9,348,604 B2
(45) Date of Patent: May 24, 2016

(54) SYSTEM AND METHOD FOR INVENTORY COLLECTION OPTIMIZATION BY SELECTIVE BINDING OF THE PRE-BOOT DRIVERS

(71) Applicant: Dell Products L.P., Round Rock, TX (US)

(72) Inventors: William C Munger, Round Rock, TX (US); Sundar Dasar, Round Rock, TX (US); Yogesh P Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 386 days.

(21) Appl. No.: 13/869,416

(22) Filed: Apr. 24, 2013

(65) Prior Publication Data
US 2014/0325196 A1    Oct. 30, 2014

(51) Int. Cl.
G06F 9/44 (2006.01)
(52) U.S. Cl.
CPC ............ *G06F 9/4411* (2013.01); *G06F 9/4401* (2013.01)
(58) Field of Classification Search
CPC ..... G06F 9/4411; G06F 13/36; G06F 21/575; G06F 1/102
USPC ............................................................ 713/2
See application file for complete search history.

(56) References Cited

U.S. PATENT DOCUMENTS

| | | | |
|---|---|---|---|
| 6,732,264 B1 * | 5/2004 | Sun et al. ........................... | 713/2 |
| 6,754,817 B2 * | 6/2004 | Khatri ................... | G06F 9/4411 710/301 |
| RE40,092 E * | 2/2008 | Kang ........................ | G06F 1/24 713/1 |
| RE42,727 E * | 9/2011 | Kang ................................ | 713/2 |
| 8,078,858 B2 | 12/2011 | Herzi et al. | |
| 8,103,862 B2 | 1/2012 | Rangarajan et al. | |
| 8,572,294 B2 * | 10/2013 | Chisholm .............. | G06F 9/4411 710/10 |
| 8,984,296 B1 * | 3/2015 | Young ................... | G06F 9/4411 713/176 |
| 2002/0133695 A1 * | 9/2002 | Khatri et al. ....................... | 713/1 |
| 2002/0184483 A1 * | 12/2002 | Morrison .............. | G06F 21/575 713/2 |
| 2005/0044348 A1 * | 2/2005 | O'Connell ............ | G06F 9/4418 713/1 |
| 2006/0095753 A1 * | 5/2006 | Hori ................................... | 713/1 |
| 2007/0157015 A1 * | 7/2007 | Swanson et al. ................... | 713/2 |
| 2008/0021984 A1 * | 1/2008 | Zarenin et al. ................ | 709/220 |
| 2008/0065814 A1 * | 3/2008 | Cornwell .............. | G06F 9/4411 711/103 |
| 2008/0072028 A1 * | 3/2008 | Allison ................. | G06F 9/4418 713/1 |
| 2008/0148037 A1 * | 6/2008 | Rothman .............. | G06F 9/4411 713/2 |
| 2009/0113198 A1 * | 4/2009 | Liu et al. ........................... | 713/2 |
| 2009/0251727 A1 * | 10/2009 | Yokomizo ............. | G06F 9/4411 358/1.15 |
| 2010/0007646 A1 * | 1/2010 | Tsuei .................... | G06F 1/3203 345/212 |
| 2010/0185844 A1 * | 7/2010 | George ................. | G06F 9/4401 713/2 |

(Continued)

*Primary Examiner* — Thomas Lee
*Assistant Examiner* — Santosh R Poudel
(74) *Attorney, Agent, or Firm* — Terrile, Cannatti, Chambers & Holland, LLP; Stephen A. Terrile

(57) ABSTRACT

A solution to optimize system boot-up time by selectively collecting device inventory for only the devices that have configuration changes and for skipping for all other devices. More specifically, the solution includes a selective driver binding operation which in certain embodiments executes within an inventory application. After the selective driver binding operation gathers data for a certain device, the selective driver binding operation gathers data for that certain device again only when data relating to the particular device has changed. Instead of binding to every device, the selective driver binding operation selectively binds only to devices with changes, thus executing system management code only for specific devices and saving boot time.

12 Claims, 4 Drawing Sheets

(56) References Cited

U.S. PATENT DOCUMENTS

| | | | |
|---|---|---|---|
| 2011/0010383 A1* | 1/2011 | Thompson et al. | 707/769 |
| 2011/0055540 A1* | 3/2011 | Lin | G06F 9/4406 713/2 |
| 2011/0154006 A1* | 6/2011 | Natu | G06F 21/575 713/2 |
| 2011/0289146 A1* | 11/2011 | Khosravi et al. | 709/205 |
| 2011/0302399 A1* | 12/2011 | Dubinsky | G06F 9/4401 713/2 |
| 2012/0096065 A1* | 4/2012 | Suit et al. | 709/202 |
| 2012/0117367 A1* | 5/2012 | Lu | G06F 9/4401 713/2 |
| 2012/0297099 A1* | 11/2012 | Kochar | G06F 13/102 710/104 |
| 2013/0013753 A1 | 1/2013 | Zessin et al. | |
| 2013/0042098 A1* | 2/2013 | Baik et al. | 713/2 |
| 2013/0138938 A1* | 5/2013 | Bang | G06F 9/4411 713/2 |
| 2014/0075172 A1* | 3/2014 | Knichel | G06F 9/4401 713/2 |
| 2014/0201511 A1* | 7/2014 | Shutt et al. | 713/2 |
| 2014/0215196 A1* | 7/2014 | Berlin | G06F 21/575 713/2 |
| 2014/0237226 A1* | 8/2014 | Berlin | G06F 9/4411 713/2 |

* cited by examiner

SYSTEM AND METHOD FOR INVENTORY COLLECTION OPTIMIZATION BY SELECTIVE BINDING OF THE PRE-BOOT DRIVERS

BACKGROUND OF THE INVENTION

1. Field of the Invention

The present invention relates to information handling systems and more particularly to inventory collection optimization by selective binding of pre-boot drivers.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One issue that relates to information handling system, especially server type information handling systems, is how to best provide system management solutions to a customer. With known server type information handling systems, many manufacturers provide an option of a Remote or Out of band (OOB) system management solution to the customer. Typically, this system management solution includes system management software which executes an inventory collection application. The inventory collection application collects system inventory information along with system configuration data and stores the system inventory information and the system configuration data to a persistent storage area. The system inventory information includes a set of properties such as Device location, Name, Vendor, firmware version etc. The system configuration data includes information regarding adjustable device settings. The inventory collection application often executes during every system boot-up. However, while inventory collection is useful for OOB system management, there is a penalty of a longer boot-up time to perform the inventory collection operation.

In known system boot scenarios which do not involve server deployment, an inventory collection operation is executed to determine if more value add operations like matching the firmware and configurations on part replacement, part addition/removal detection needs to be run. This inventory collection operation adds up to the boot-up time.

Normally the inventory application drivers bind to each device during the pre-boot process, causing execution of system management code (part replacement, detecting additions/removals) for all devices. Binding each device links an inventory application driver with a respective device and maintains synchronization between the inventory application driver and a respective device. FIG. 1, labeled Prior Art, shows a block diagram of an example of this binding between inventory application drivers and devices. More specifically, each device of the information handling system includes a corresponding pre boot instance which is generated by a respective application driver.

SUMMARY OF THE INVENTION

In accordance with the present invention, a solution to optimize system boot-up time by selectively collecting device inventory for only the devices that have configuration changes and for skipping for all other devices is set forth. More specifically, the solution includes a selective driver binding operation which in certain embodiments executes within an inventory application. After the selective driver binding operation gathers data for a certain device, the selective driver binding operation gathers data for that certain device again only when data relating to the particular device has changed. Instead of binding to every device, the selective driver binding operation selectively binds only to devices with changes, thus executing system management code only for specific devices and saving boot time.

More specifically, in certain embodiments, the selective driver binding operation determines which devices have changes by maintaining a hash value for each device. The hash value is calculated on each boot across all the data gathered from the device, and is stored in non-volatile storage of a memory. On subsequent boots, the selective driver binding operation calculates the hash value again for each device and compares newly calculated hash value to the hash stored in non-volatile storage.

The selective driver binding operation processes only the changed devices (as indicated by hash values which changed across reboot). The selective driver binding operation then performs the usual tasks for these devices (such as part replacement, detection of added/removed devices, etc.) and then stores updated hash values in the non-volatile storage for future boots. Most boots of the information handling system will thus see a reduced boot-up time, and in the few boots where devices have changed, this solution will not add any penalty to the boot-up time.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 2:
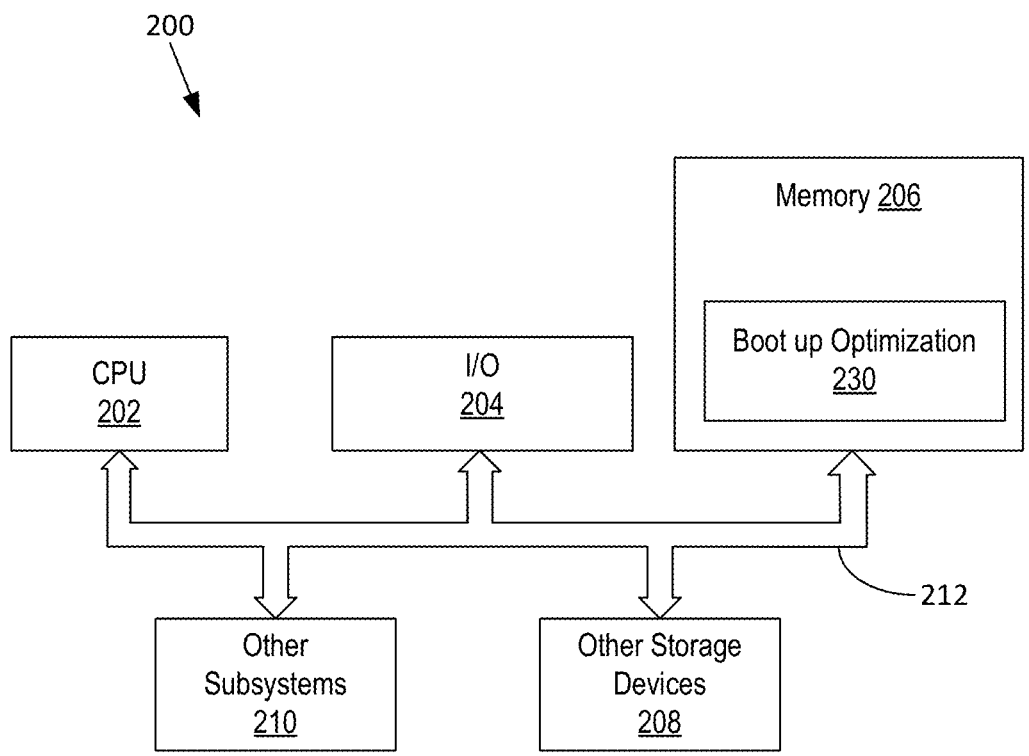
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers (each of which may be coupled remotely to the information handling system 200), a memory 206 including volatile memory such as random access memory (RAM) and non-volatile memory such as a hard disk and drive, and other storage devices 208, such as an optical disk and drive and other memory devices, and various other subsystems 210, all interconnected via one or more buses 212.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The information handling system 200 further includes a boot-up time optimization module 230 which optimizes system boot-up time by selectively collecting device inventory for only the devices that have configuration changes and for skipping for all other devices. More specifically, the boot-up time optimization module 230 includes an inventory application which performs a selective driver binding operation. After the inventory application gathers data for a certain device, the inventory application gathers data for that certain device again only when data relating to the particular device has changed. Instead of binding to every device, the inventory application selectively binds only to devices with changes, thus executing system management code only for specific devices and saving boot time.

The inventory application determines which devices have changes by maintaining a hash value for each device. The hash value is calculated on each boot across all the data gathered from the device, and is stored in non-volatile storage of the memory 206. On subsequent boots, the inventory application calculates the hash value again for each device and compares it to the hash stored in non-volatile storage.

The inventory application processes only the changed devices (as indicated by hash values which changed across reboot). The inventory application then performs the usual tasks for these devices (such as part replacement, detection of added/removed devices, etc.) and then stores updated hash values in the non-volatile storage for future boots. Most boots of the information handling system will thus see a reduced boot-up time, and in the few boots where devices have changed, this solution will not add any penalty to the boot-up time.

Figure 3:
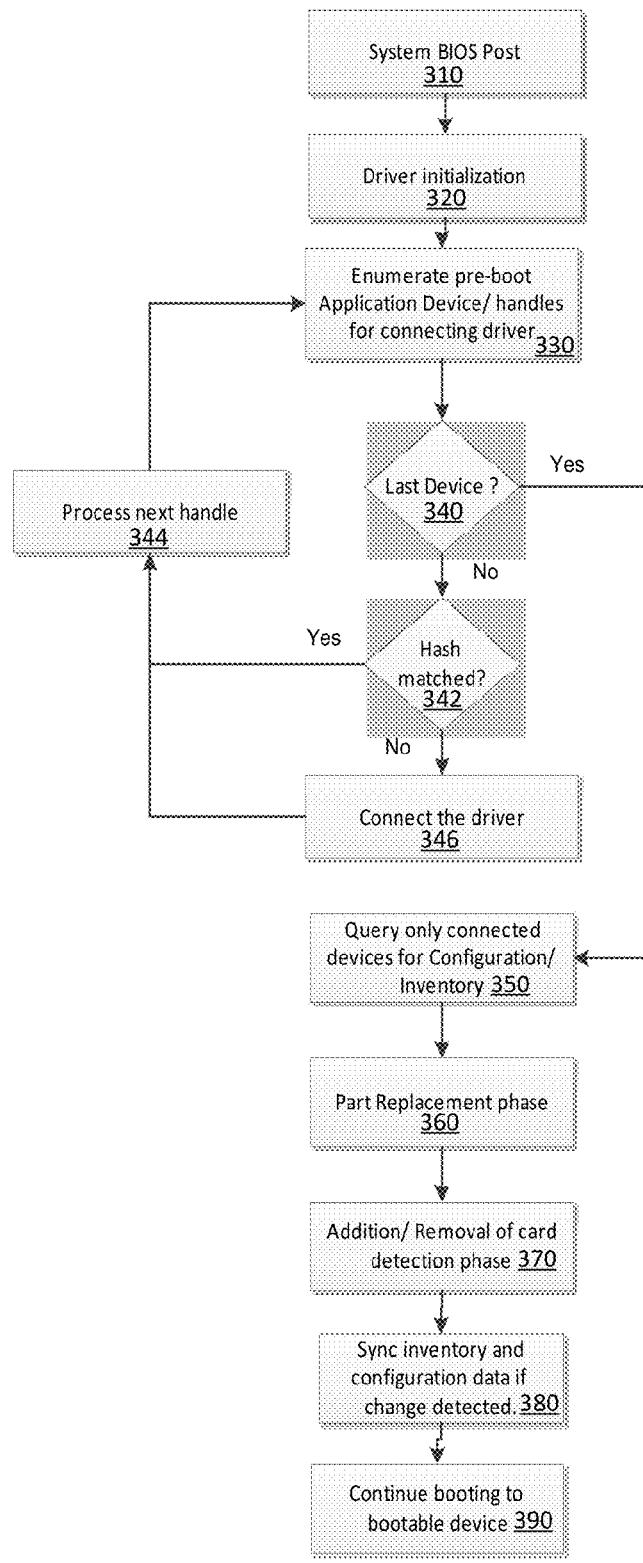
FIG. 3 shows a flow chart of inventory collection optimization by selective binding of pre-boot drivers.

Referring to FIG. 3, a flow chart the operation of the boot-up time optimization module 230 when performing inventory collection optimization by selective binding of pre-boot drivers is shown. More specifically, the boot-up time optimization module 230 begins operation by performing a system basic input output system (BIOS) power on self test (POST) operation at step 310. Next, at step 320 the boot-up time optimization module 230 performs a driver initialization operation. Next the boot-up time optimization module 230 enumerates pre-boot application device handles for connecting respective drivers to the respective devices at step 330. Next, at step 340 the boot-up time optimization module 230 determines whether a present device is the last device to be analyzed for boot-up time optimization. If not, then at step 342, the boot-up time optimization module 230 determines whether a present hash value matches a value that is stored for that device within memory 106. If the hash values match, then the boot-up time optimization module 230 proceeds to process a next handle at step 344. If the hash values do not match as determined by step 342, then the boot-up time optimization module 230 connects (i.e., binds) the driver to the device at step 346 and then proceeds to process a next handle at step 344.

If at step 340, boot-up time optimization module 230 determines that the device being analyzed is the last device to be analyzed, then the boot-up time optimization module 230 proceeds to step 350 where the boot-up time optimization module 230 only queries the devices that are identified for a configuration/inventory operation. The configuration portion of the configuration/inventory operation operation sets specific values to the device's configurable settings. The inventory portion of the operation collects current and possible values of the device settings. Next, at step 360, the boot-up time optimization module 230 performs a part replacement phase mode of operation. During the part replacement phase mode of operation any added or removed or replaced device is detected. Next, at step 370 the boot-up time optimization module 230 performs an addition/removal of card detection phase mode of operation. Next, at step 380, the boot-up time optimization module 230 synchronizes inventory and configuration data if any changes occurred during the boot-up operation. Finally, at step 390, the boot-up time optimization module 230 continues operation by booting to a bootable device within the information handling system 200.

Figure 1:
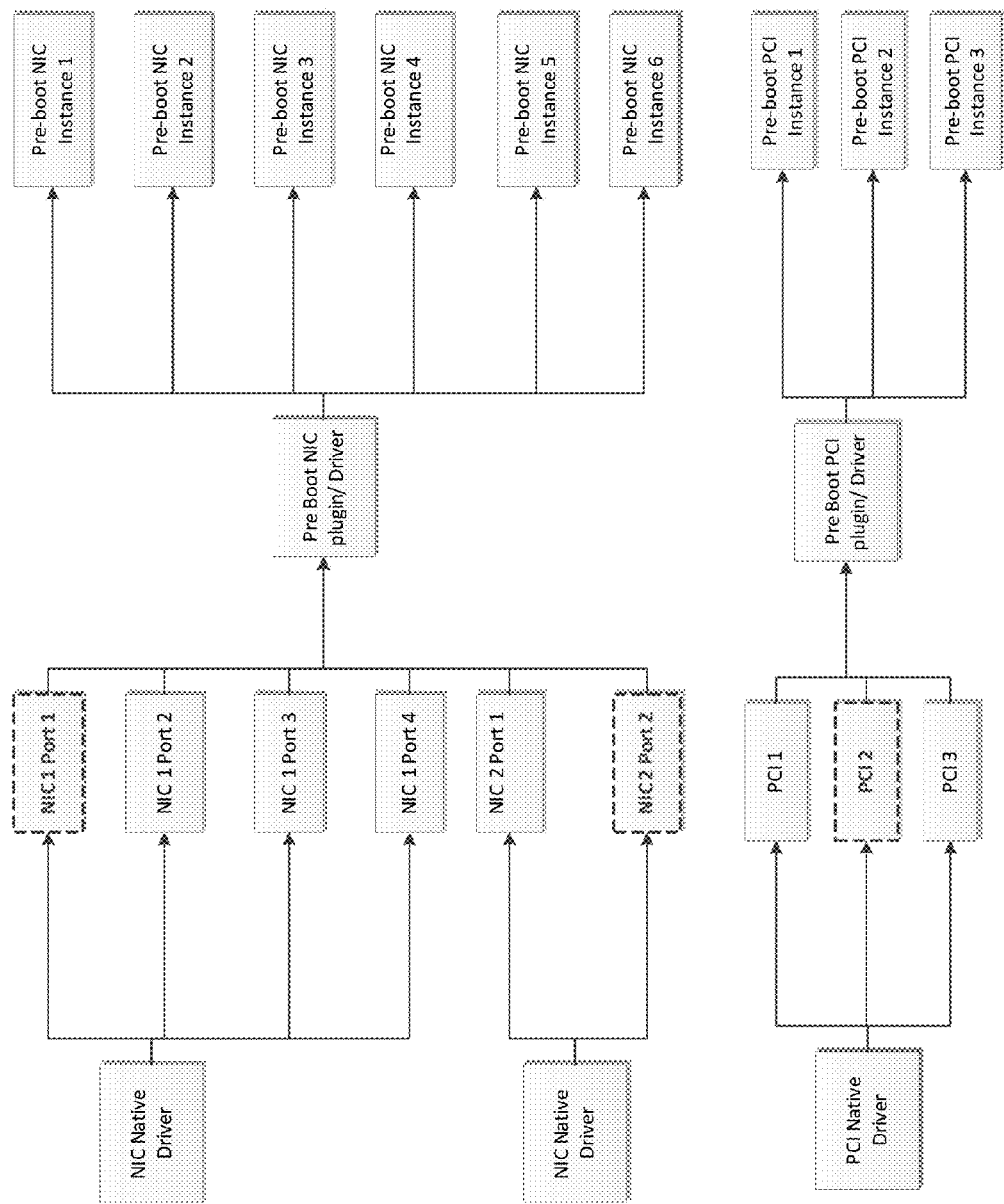
FIG. 1, labeled Prior Art, shows a block diagram of an example of this binding between inventory application drivers and devices.
Figure 4:
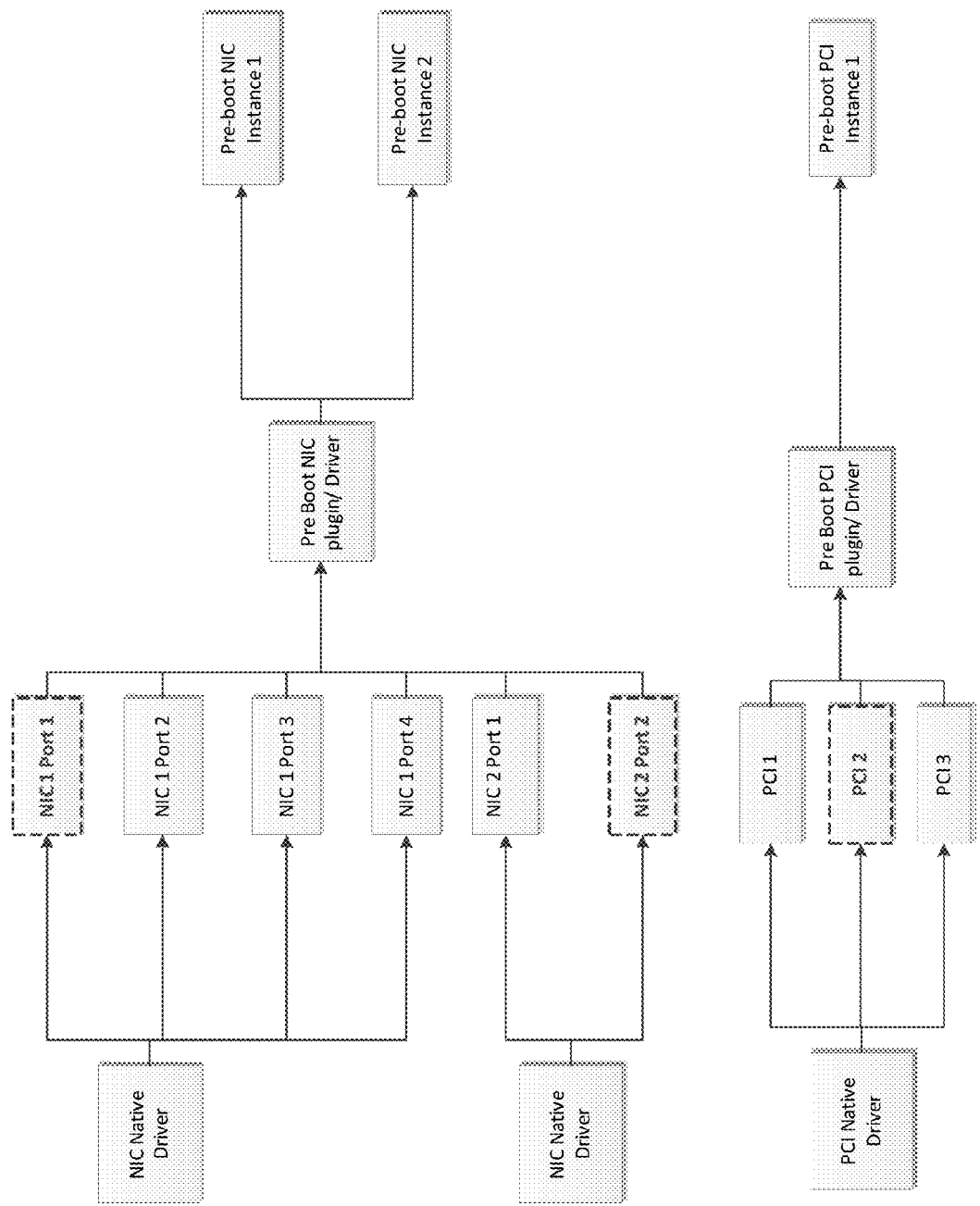
FIG. 4 shows a block diagram of an example of this binding between inventory application drivers and devices.

Referring to FIG. 4, a block diagram of an example of binding between inventory application drivers and devices is shown. More specifically, when performing a boot-up operation using the boot-up time optimization module 230, only devices which have changed are updated. In the example shown in FIG. 4, two NIC ports (NIC 1 Port 1, NIC 2 Port 2) and one PCI port (PCI 2) have changed. The boot-up time optimization module 230 determines that these devices have changed by comparing a present hash value with a previous hash value for each device. For each device which has changed, a new pre-boot instance is generated. For example, a pre-boot NIC instance 1 is generated for the NIC 1 Port 1 device and a pre-boot NIC instance 2 is generated for the NIC 2 Port 2 device. Additionally, a pre-boot PCI instance 1 is generated for the PCI 2 device. In this way, for this example, three updated instances are generated as compared with nine instances generated for the example shown in FIG. 1.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for optimizing boot-up time of an information handling system comprising:
   determining whether one or more of a plurality of devices within the information handling system have changed configuration status from a last most recent boot-up operation;
   collecting device inventory information for only the devices that have changed configuration status from the last most recent boot-up operation;
   skipping collection of device inventory information for all other devices; and,
   performing a selective driver binding operation upon the devices that have changed configuration status; and wherein
   the selective driver binding operation further comprises determining which devices have changed by maintaining a hash value for each device where the hash value is calculated on each boot across all data gathered from a respective device and on subsequent boots, the selective driver binding operation calculates a subsequent boot hash value for each device and compares the subsequent boot hash value to the hash value.

2. The method of claim 1 wherein:
   the selective driver binding operation comprises gathering data only for the devices that have changed configuration status and selectively binding only devices with changes, thus executing system management code only for specific devices and saving boot time.

3. The method of claim 1 wherein:
   the selective driver binding operation performs boot-up operations only on devices where the subsequent boot hash value is different from the hash value.

4. The method of claim 3 wherein:
   the selective driver binding operation stores the subsequent boot hash value as the hash value for devices in which the boot-up operations is performed for future boot-up operations.

5. An information handling system comprising:
   a processor;
   memory coupled to the processor, the memory storing a boot-up time optimization module, the boot-up time optimization module comprising instructions stored on the memory and executable by the processor for:
   determining whether one or more of a plurality of devices within the information handling system have changed configuration status from a last most recent boot-up operation;
   collecting device inventory information for only the devices that have changed configuration status from the last most recent boot-up operation;
   skipping collection of device inventory information for all other devices; and,
   performing a selective driver binding operation upon the devices that have changed configuration status; and wherein
   the selective driver binding operation further comprises determining which devices have changed by maintaining a hash value for each device where the hash value is calculated on each boot across all data gathered from a respective device and on subsequent boots, the selective driver binding operation calculates a subsequent boot hash value for each device and compares the subsequent boot hash value to the hash value.

6. The information handling system of claim 5 wherein:
   the selective driver binding operation comprises gathering data only for the devices that have changed configuration status and selectively binding only devices with changes, thus executing system management code only for specific devices and saving boot time.

7. The information handling system of claim 5 wherein:
   the selective driver binding operation performs boot-up operations only on devices where the subsequent boot hash value is different from the hash value.

8. The information handling system of claim 7 wherein:
   the selective driver binding operation stores the subsequent boot hash value as the hash value for devices in which the boot-up operations is performed for future boot-up operations.

9. A non-transitory computer readable medium embodying computer program code, the computer program code comprising processor executable instructions configured for:
   determining whether one or more of a plurality of devices within the information handling system have changed configuration status from a last most recent boot-up operation;
   collecting device inventory information for only the devices that have changed configuration status from the last most recent boot-up operation;
   skipping collection of device inventory information for all other devices; and,
   performing a selective driver binding operation upon the devices that have changed configuration status; and wherein
   the selective driver binding operation further comprises determining which devices have changed by maintaining a hash value for each device where the hash value is calculated on each boot across all data gathered from a respective device and on subsequent boots, the selective driver binding operation calculates a subsequent boot hash value for each device and compares the subsequent boot hash value to the hash value.

10. The non-transitory computer readable medium of claim 9 wherein:

the selective driver binding operation comprises gathering data only for the devices that have changed configuration status and selectively binding only devices with changes, thus executing system management code only for specific devices and saving boot time.

11. The non-transitory computer readable medium of claim 9 wherein:
the selective driver binding operation performs boot-up operations only on devices where the subsequent boot hash value is different from the hash value.

12. The non-transitory computer readable medium of claim 11 wherein:
the selective driver binding operation stores the subsequent boot hash value as the hash value for devices in which the boot-up operations is performed for future boot-up operations.

\* \* \* \* \*